United States Patent
Shantamurthy et al.

(10) Patent No.: US 10,896,087 B2
(45) Date of Patent: Jan. 19, 2021

(54) SYSTEM FOR CONFIGURABLE ERROR HANDLING

(71) Applicant: Microsoft Technology Licensing, LLC, Redmond, WA (US)

(72) Inventors: Ravi Mysore Shantamurthy, Bothell, WA (US); Tom Long Nguyen, Auburn, WA (US); Mallik Bulusu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 16/184,003

(22) Filed: Nov. 8, 2018

(65) Prior Publication Data
US 2020/0151048 A1 May 14, 2020

(51) Int. Cl.
| | | |
|---|---|---|
| G06F 11/00 | (2006.01) | |
| G06F 11/07 | (2006.01) | |
| G06F 13/40 | (2006.01) | |
| G06F 13/42 | (2006.01) | |

(52) U.S. Cl.
CPC ...... *G06F 11/0793* (2013.01); *G06F 11/0745* (2013.01); *G06F 11/0751* (2013.01); *G06F 13/4068* (2013.01); *G06F 13/4282* (2013.01); *G06F 2213/0026* (2013.01)

(58) Field of Classification Search
CPC ............. G06F 11/0745; G06F 11/0751; G06F 11/0793; G06F 13/4068; G06F 13/4282
See application file for complete search history.

(56) References Cited

U.S. PATENT DOCUMENTS

| | | | |
|---|---|---|---|
| 2006/0075301 A1* | 4/2006 | Fossum | G06F 9/3824 714/38.13 |
| 2007/0011500 A1 | 1/2007 | Dasari et al. | |
| 2007/0061634 A1 | 3/2007 | Marisetty et al. | |
| 2008/0256400 A1* | 10/2008 | Yang | G06F 11/076 714/57 |
| 2011/0138219 A1* | 6/2011 | Walton | G06F 11/0712 714/3 |
| 2017/0091013 A1* | 3/2017 | Tallam | G06F 11/0772 |

OTHER PUBLICATIONS

"International Search Report and Written Opinion Issued in PCT Application No. PCT/US2019/059288", dated Mar. 6, 2020, 12 Pages.

* cited by examiner

*Primary Examiner* — Joshua P Lottich
(74) *Attorney, Agent, or Firm* — Buckley, Maschoff & Talwalkar LLC (57) ABSTRACT

An error-handling system provides detection of an error on an I/O hardware endpoint, triggering of an operating system interrupt in response to detected error, reception of the interrupt at an operating system component, determination, in response to the received interrupt, whether to handle the error using an operating system handler or a firmware error handler associated with the I/O hardware endpoint, and, if it is determined to handle the error using a firmware runtime error handler associated with the I/O hardware endpoint, triggering of a firmware interrupt associated with the firmware runtime error handler.

20 Claims, 7 Drawing Sheets

SYSTEM FOR CONFIGURABLE ERROR HANDLING

BACKGROUND

Conventional computer hardware devices are able to detect errors in their functioning and report the errors to the computing platform in which they are installed. The errors may then be propagated through the platform software stacks for appropriate handling. Errors may be propagated to the firmware or directly to the operating system (O/S). If the error is first propagated to the firmware, a BIOS System Management Mode component receives control to handle the error, and control is then transferred to the O/S.

During pre-boot processes, the platform is initialized to specify the error propagation scheme (e.g., firmware first or O/S first) for each installed hardware device. Such hardware devices may include memory modules and Peripheral Component Interconnect express (PCIe) devices for accelerated networking, compute offloads, storage or other services. The error propagation scheme specified for a device cannot be changed during runtime.

A flexible error handling mechanism is desired by which an O/S may determine whether to handle errors in a suitable manner or provide control back to BIOS for typical firmware-first error handling. On-demand updates to an error propagation scheme for a particular hardware endpoint are also desirable, particularly updates which do not require hardware re-initialization.

DETAILED DESCRIPTION

The following description is provided to enable any person in the art to make and use the described embodiments. Various modifications, however, will remain readily-apparent to those in the art.

Some embodiments provide a technical solution to the technical problem of fixed error propagation schemes by determining at the O/S whether to handle an error in the O/S or the firmware based on updatable filtering logic. Embodiments may also provide a technical solution to the problem of excessive downtime during platform customization/update by allowing updates to the filtering logic without requiring hardware re-initialization.

Generally, some embodiments operate to detect a hardware endpoint error and trigger a software interrupt received by an Advanced Configuration and Power Interface (ACPI) runtime component. The ACPI runtime component determines whether the error is designated to be handled by a firmware-based error handler and, if so, trigger a software interrupt to a firmware component for handling the error. If the error is not designated to be handled by a firmware-based error handler, the error is handled by a suitable O/S error handler.

The determination of whether the error is designated to be handled by a firmware-based error handler may be based on the presence or absence of a corresponding ACPI device-specific method in the O/S layer. Advantageously, and according to some embodiments, the error propagation scheme for a hardware endpoint may be changed without changing the platform BIOS, but simply by updating one or more ACPI device-specific methods and O/S handlers. In some instances, the ACPI device-specific methods and O/S handlers may be updated (and the error propagation scheme thereby changed) without re-initializing the platform, thereby minimizing system downtime.

Figure 1:
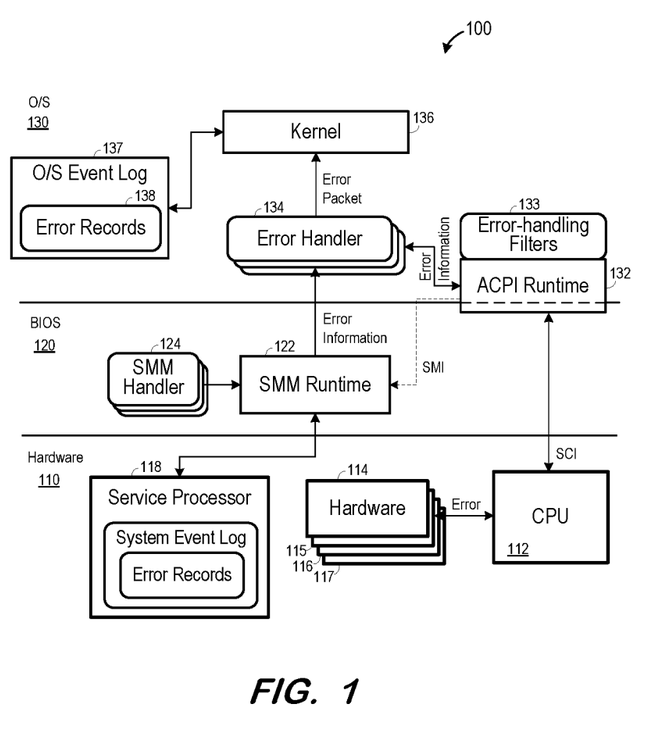
FIG. 1 illustrates error propagation in a platform architecture according to some embodiments.

FIG. 1 is a block diagram of platform architecture 100 according to some embodiments. Platform architecture 100 may represent a server runtime architecture. Architecture 100 may support user-mode applications and/or virtual machines as is known in the art.

Hardware layer 110 of architecture 100 includes Central Processing Unit (CPU) 112, which is configured to detect errors from various hardware endpoints 114-117. According to some embodiments, a hardware endpoint 114-117 errors are detected by a controller or port of CPU 112. Embodiments may include more than one CPU, and each of such CPUs may receive error notifications from any number of hardware endpoints.

Hardware layer 110 also includes Service Processor 118. Service Processor 118 may comprise a microcontroller distinct from CPU 112 and which manages platform-specific functions such as monitoring environmental conditions and handling certain error conditions. Service Processor 118 may persist error records within a system event log for post-crash analysis, for example, and may comprise a component of a Baseboard Management Controller.

BIOS layer 120 includes runtime components which are initialized during BIOS boot-up. Specifically, System Management Mode (SMM) runtime 122 is initialized and associated with device-specific error handlers 124. ACPI runtime 132 is also initialized during BIOS boot.

BIOS boot may further include configuration of error signaling as an ACPI System Control Interrupt (SCI) as opposed to an SMI (System Management Interrupt) propagated to SMM runtime 122. This configuration may be specified via a General-Purpose IO (GPIO) setting of a Platform Controller Hub (not shown) as is known in the art.

O/S layer 130 includes runtime components instantiated during booting of the O/S following the BIOS boot. Error-handling filters 133 may comprise Device-Specific Methods (_DSM) associated with one or more hardware endpoints. Usage of error-handling filters 133 will be described in detail below.

Error handlers 134, kernel 136 and O/S event log 137 of O/S layer 130 may operate as is known in the art. For example, an error handler 134 corresponding to the hardware having the error condition creates an error packet and forwards the packet to kernel 136. Kernel 136 creates an error record based on the error packet and may log the error record among error records 138 of O/S event log 137. In the case of a nonfatal uncorrected hardware error, kernel 136 may attempt to correct the error condition.

Figure 2:
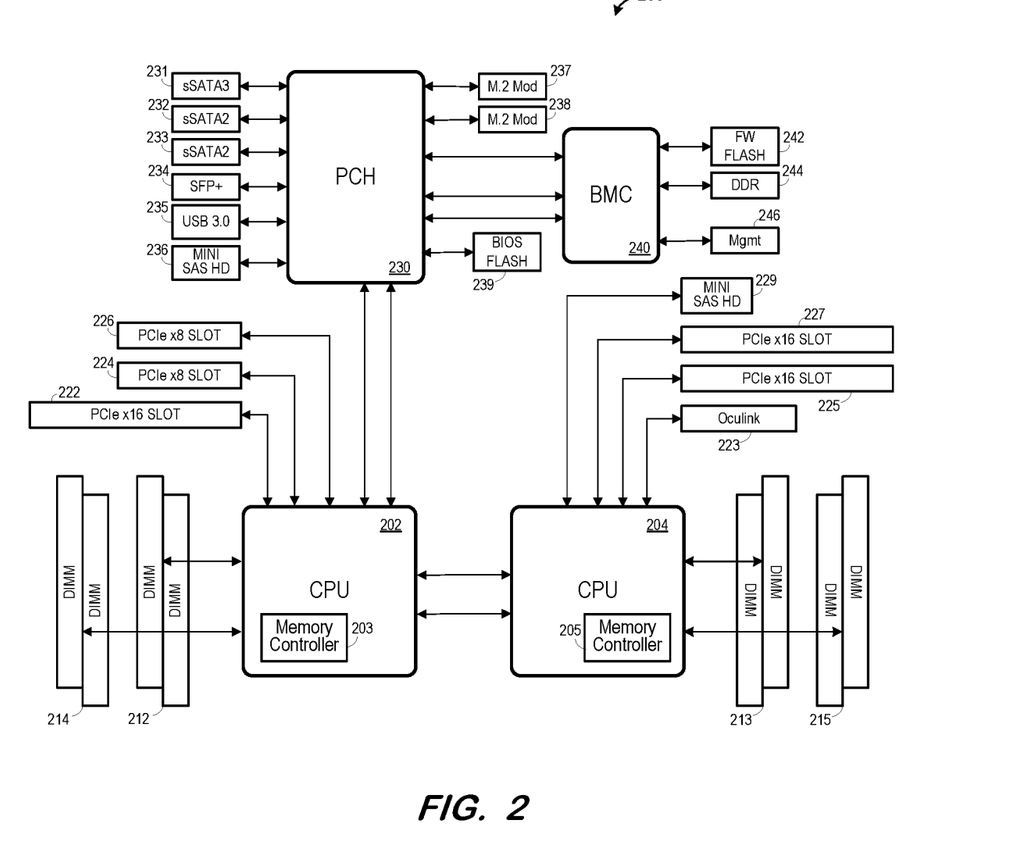
FIG. 2 is a block diagram of a hardware architecture of a server platform according to some embodiments.

FIG. 2 is a block diagram of platform 200 according to some embodiments. Platform 200 may implement architecture 100, but embodiments are not limited thereto.

Platform 200 comprises two CPUs 202 and 204, which may comprise any types of CPUs that are or become known. Embodiments are not limited to platforms including any particular number of CPUs. Each CPU 202 and 204 is connected to various I/O interfaces into which corresponding hardware I/O endpoints may be installed.

For example, CPU 202 is coupled to Dual In-line Memory Modules (DIMMs) 212 and 214. CPU 202 includes integrated memory controller 203 to interface with DIMMs 212. Accordingly, memory controller 203 operates to detect errors in DIMMs 212 and 214 and to take appropriate corrective actions, if possible. Memory controller 203 also logs error information into architected error context registers, e.g., Memory-Specific Registers (MSRs) of CPU 202. CPU 203 is coupled directly to DIMMs 213 and 215 and includes memory controller 205 which may operate as described above.

CPU 202 is also directly coupled to PCIe slots 222, 224 and 226. PCIe slots 222, 224 and 226 may mount expansion cards providing networking, graphics processing, storage or other functionality. Each expansion card may communicate directly with a PCIe root port of CPU 202 through its associated PCIe slot 222, 224 or 226 and the bus connecting the slot with CPU 202. The PCIe root port of CPU 202 may detect errors on ay PCIe endpoints to which it is connected. Again, CPU 204 is also coupled to PCIe slots 225 and 227 and may include a PCIe root port to detect errors from PCIe endpoints installed therein.

CPU 202 is coupled to Platform Controller Hub (PCH) 230 as is known in the art. PCH 230 controls certain data paths and support functions used in conjunction with CPUs 202 and 204. PCH 230 is coupled to Flash memory 239 storing the BIOS as well as to Baseboard Management Controller (BMC) 240. BMC 240 is a specialized service processor that monitors the physical state of platform 200, and may support out-of-band communications with a system administrator through management interface 246.

Figure 3:
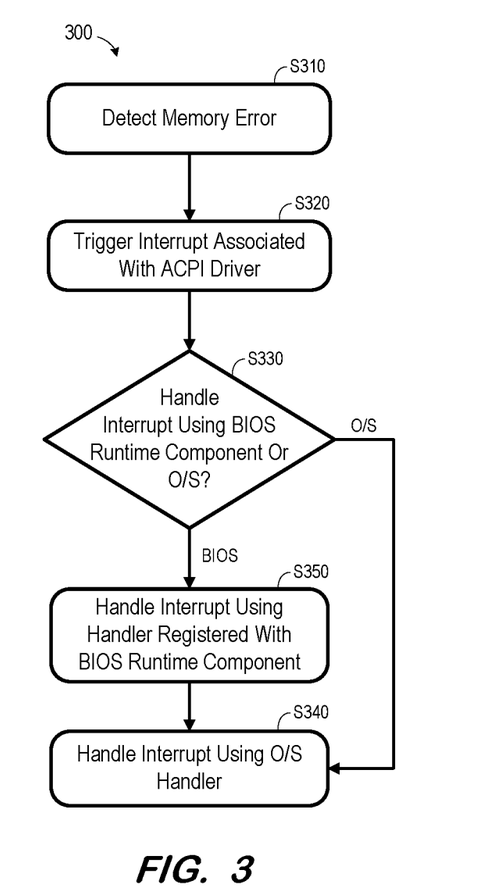
FIG. 3 is a flow diagram of a process to propagate a memory error according to some embodiments.

FIG. 3 comprises a flow diagram of process 300 according to some embodiments. In some embodiments, processing units (e.g., one or more processors, processing cores, processor threads) of a computing device (e.g., a computer server) execute program code to cause the device to perform process 300. Process 300 and all other processes mentioned herein may be embodied in processor-executable program code read from one or more of non-transitory computer-readable media, such as a hard disk, a Flash drive, etc., and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 300 commences upon detection of a memory error at S310. As described above, a platform memory controller (which may or may not be integrated into a platform CPU) may detect a memory error at S310 using known error signaling and detection protocols. The memory controller may take corrective actions and may also log corresponding error information into architected error context registers of a platform CPU.

The logged error information causes the CPU to trigger an interrupt at S320. The interrupt may comprise an SCI which is received by an ACPI runtime component as illustrated in FIG. 1. Next, at S330, the ACPI runtime component determines whether the error should be handled by a firmware-based error handler in the BIOS runtime, or by an O/S error handler.

The determination at S330 may include determining whether the O/S includes a device-specific method associated with the error source. If no such method exists, flow proceeds to S340 to handle the interrupt using an O/S error handler (e.g., handler 134). Advantageously, such error handling may proceed on the processing thread which receives the error, leaving other processing threads to execute O/S functions.

If a device-specific method exists, the interrupt is handled at S350 by an error handler registered with the BIOS runtime (e.g., with the System Management Mode runtime). In this regard, the ACPI runtime may raise a System Management Interrupt (SMI) as shown in FIG. 1 to trigger the SMM error handler. Flow then continues from S350 to S340 to pass control to the O/S error handler.

Figure 4:
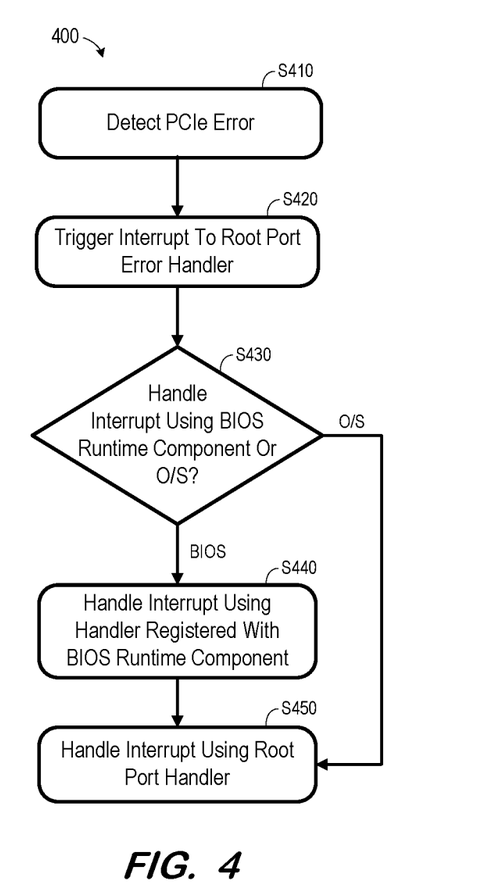
FIG. 4 is a flow diagram of a process to propagate a PCIe error according to some embodiments.

Process 300 need not be limited to memory errors, but may be extended to handle errors detected for any hardware endpoint. Particular implementations of error detection and raising of the SCI may differ depending upon the hardware endpoint. Process 400 of FIG. 4 depicts processing of detected PCIe errors according to some embodiments.

A PCIe error is detected at S410. Each PCIe endpoint installed in a platform is associated with a PCIe root port. A PCIe root port may detect errors from its associated PCIe device. PCIe root ports may be integrated into a CPU, a PCH or any suitable hardware component.

In response to detection of an error, the PCIe root port triggers a PCIe Advanced Error Reporting (AER) Message Signal Interrupt (MSI) at S420. The MSI is received by an O/S root port error handler, which triggers an SCI in response thereto. As described above, the SCI is received by an ACPI runtime component, which determines at S430 whether the error should be handled by a firmware-based error handler in the BIOS runtime.

The determination at S430 may proceed similarly to that described above with respect to S330. Specifically, if a device-specific method associated with the error source exists, the ACPI runtime may raise an SMI to trigger a corresponding SMM error handler to handle the error at S440. Flow then proceeds to S450 to return control to the O/S root port error handler. If no corresponding device-specific method is identified at S430, the error is returned to the O/S root port error handler at S450 without first returning control to the BIOS.

Figure 5:
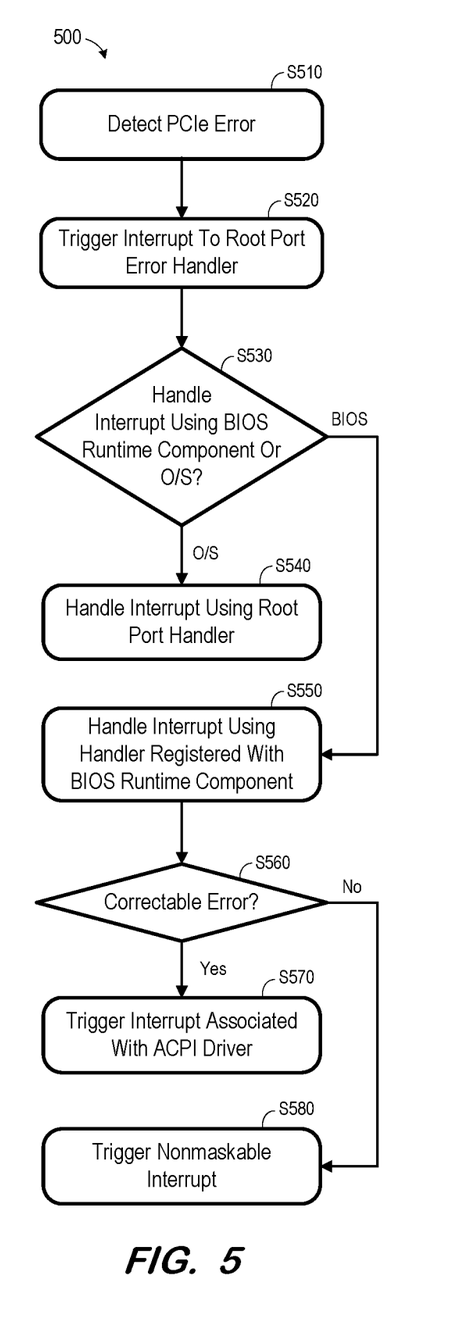
FIG. 5 is a flow diagram of a process to propagate a PCIe error according to some embodiments.

Process 500 of FIG. 5 illustrates an alternative approach to handling PCIe errors according to some embodiments. S510, S520, S530 and S540 may proceed similarly to S410, S420, S430 and S450 as described above in a case that it is determined that a detected PCIe error is to be handled exclusively by an O/S root port handler.

However, if it is determined at S530 that a detected PCIe error is to be handled by an SMM handler, flow initially proceeds to S550 to handle the error using the SMM handler. After the SMM handler completes its processing, it is determined whether the error is a correctable error at S560. If so, an SCI is triggered at S570 to return control to the ACPI runtime. If the error is determined to be uncorrectable at S560, a Non-Maskable Interrupt (NMI) is triggered at S580. An NMI is reported to the O/S regardless of the processor's current interrupt priority level. An NMI usually indicates a fatal hardware error condition and is acted on by the O/S accordingly.

Figure 6:
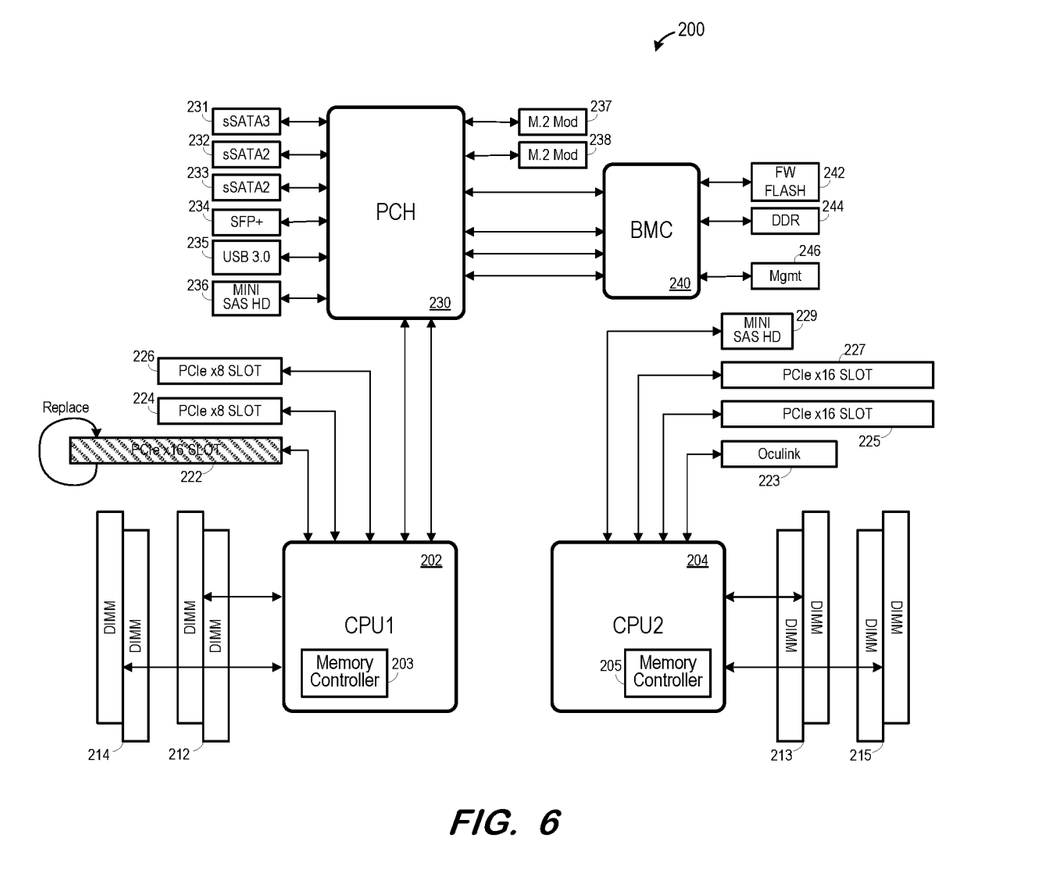
FIG. 6 is a block diagram illustrating replacing an I/O endpoint according to some embodiments.

FIG. 6 illustrates replacement of a PCIe endpoint installed in socket 222 of platform 200 with a non-identical (e.g., upgraded) PCIe endpoint. Replacement of such an endpoint may conventionally require a firmware update or at least a system reboot to ensure proper error handling.

Figure 7:
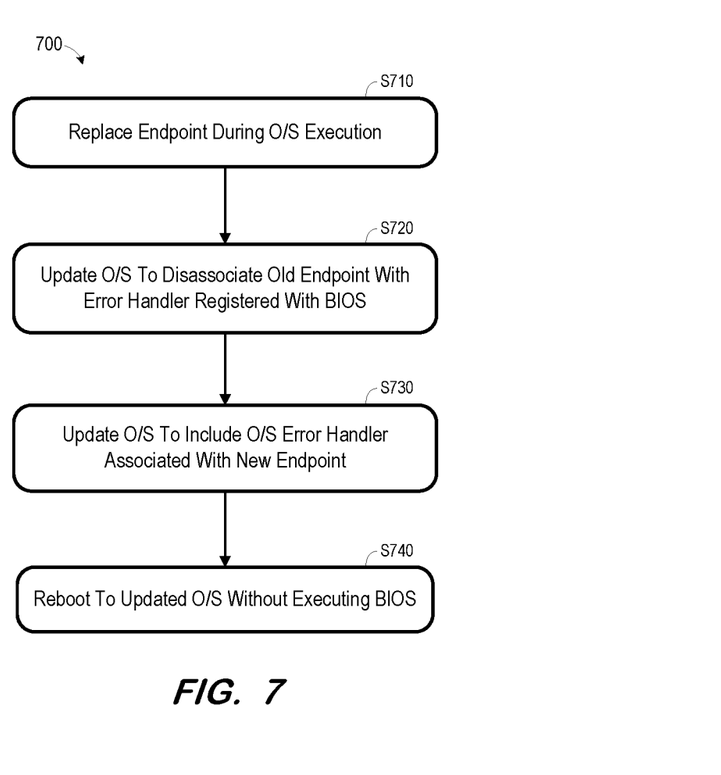
FIG. 7 is a flow diagram of a process to change an error propagation scheme for a replaced I/O endpoint in a server platform without requiring a hard reboot according to some embodiments.

FIG. 7 illustrates process 700 for responding to a replaced hardware endpoint according to some embodiments. At S710, an endpoint is replaced during O/S execution. For example, during the replacement of an endpoint within a platform (e.g., a computer server) at S710, the platform has fully booted into its O/S and the O/S is running to serve requests received from applications.

Next, at S720, the O/S is updated to disassociate the endpoint with a BIOS error handler. It is therefore assumed that the prior endpoint was associated with an SMM error handler and its errors were first handled by the SMM error handler as described with respect to processes 400 and 500. As also described above, some embodiments may associate an error source with an SMM error handler using an ACPI device-specific method. Accordingly, S720 may comprise disabling or uninstalling an ACPI device-specific method which associates the prior endpoint with an SMM error handler. The O/S is then updated at S730 to include an O/S error handler associated with the replacement endpoint.

At S740, the platform is rebooted to the now-updated O/S without executing the BIOS. In some embodiments, S740 consists of a Kernel Soft Reboot (KSR) which reboots the O/S without re-initializing the platform hardware. For example, control is handed to a driver rather than to firmware after shutdown, and proceeds directly to kernel initialization while bypassing platform initialization, the boot manager and the O/S loader. A KSR may advantageously allow execution of an updated O/S while experiencing minimal platform downtime.

By virtue of the foregoing, and according to processes 400 and 500, detected errors from the new endpoint will be handled by the newly-included O/S handler, rather than by an SMM handler associated with the prior endpoint. Such an arrangement allows introduction of new endpoint hardware error handling into the platform without requiring a firmware update. Moreover, using a KSR or other similar technology, the platform downtime is significantly reduced.

Each functional component described herein may be implemented in computer hardware (integrated and/or discrete circuit components), in program code and/or in one or more computing systems executing such program code as is known in the art. Such a computing system may include one or more processing units which execute processor-executable program code stored in a memory system.

The above-described diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A computing system comprising:
   an I/O hardware endpoint;
   an I/O hardware endpoint controller in communication with the I/O hardware endpoint and to:
      detect an error on the I/O hardware endpoint; and
      trigger an interrupt associated with the I/O hardware endpoint in response to detected error; and
   a processor to execute a runtime component executed by an operating system of the computing system to:
      receive the interrupt;
      in response to the received interrupt, determine whether the operating system includes a device-specific method associated with the interrupt; and
      if it is determined that the operating system includes a device-specific method associated with the interrupt, determine to handle the error using an operating system handler associated with the I/O hardware endpoint; and
      if it is determined that the operating system does not include a device-specific method associated with the interrupt:
         determine to handle the error using a firmware runtime error handler associated with the I/O hardware endpoint; and
         trigger a firmware interrupt associated with the firmware runtime error handler.

2. A computing system according to claim 1, wherein the interrupt is an Advanced Configuration and Power Interface System Control Interrupt and the runtime component is an Advanced Configuration and Power Interface software driver.

3. A computing system according to claim 2, wherein the firmware interrupt is a System Management Interrupt and the firmware runtime error handler is a System Management Mode error handler.

4. A computing system according to claim 2, wherein determination to handle the error using a firmware error handler associated with the I/O hardware endpoint comprises:
   identification of an Advanced Configuration and Power Interface Device-Specific Method registered in the operating system and associated with the I/O hardware endpoint and the firmware error handler.

5. A computing system according to claim 1, the processor further to execute the firmware error handler and, after execution of the firmware error handler, execute an operating system handler associated with the I/O hardware endpoint.

6. A computing system according to claim 1, wherein the I/O hardware endpoint is a memory device, wherein the I/O hardware endpoint controller is a memory controller within the processor, and wherein the interrupt is triggered in response to writing of error information by the memory controller into one or more Machine-Specific Registers of the processor.

7. A computing system according to claim 1, wherein the I/O hardware endpoint is a Peripheral Component Interconnect express device, wherein the I/O hardware endpoint controller is a root port controller, and wherein the interrupt is triggered to a root port error handler.

8. A computer-implemented method comprising:
   detecting an error on an I/O hardware endpoint;
   triggering an operating system interrupt associated with the I/O hardware endpoint in response to detected error;
   receiving the interrupt at a runtime component executed by the operating system;

in response to the received interrupt, determining at the runtime component whether the operating system includes a device-specific method associated with the interrupt;

if it is determined that the operating system includes a device-specific method associated with the interrupt, determining to handle the error using an operating system handler associated with the I/O hardware endpoint; and if it is determined that the operating system does not include a device-specific method associated with the interrupt:

determining to handle the error using a firmware runtime error handler associated with the I/O hardware endpoint; and triggering a firmware interrupt associated with the firmware runtime error handler.

9. A computer-implemented method according to claim 8, wherein the interrupt is an Advanced Configuration and Power Interface System Control Interrupt and the runtime component is an Advanced Configuration and Power Interface software driver.

10. A computer-implemented method according to claim 9, wherein the firmware interrupt is a System Management Interrupt and the firmware runtime error handler is a System Management Mode error handler.

11. A computer-implemented method according to claim 9, wherein determining to handle the error using a firmware error handler associated with the I/O hardware endpoint comprises:

identifying an Advanced Configuration and Power Interface Device-Specific Method registered in the operating system and associated with the I/O hardware endpoint and the firmware error handler.

12. A computer-implemented method according to claim 8, further comprising:

executing the firmware error handler; and executing an operating system handler associated with the I/O hardware endpoint, after execution of the firmware error handler.

13. A computer-implemented method according to claim 8, wherein the I/O hardware endpoint is a memory device, wherein the I/O hardware endpoint controller is a memory controller, and wherein the interrupt is triggered by a processor in response to writing of error information into one or more Machine-Specific Registers of the processor.

14. A computer-implemented method according to claim 8, wherein the I/O hardware endpoint is a Peripheral Component Interconnect express device, wherein the I/O hardware endpoint controller is a root port controller, and wherein the interrupt is triggered to a root port error handler.

15. A computing platform providing a runtime architecture comprising:

an I/O hardware endpoint;

an I/O hardware endpoint controller in communication with the I/O hardware endpoint;

an Advanced Configuration and Power Interface System driver runtime component;

one or more Device-Specific Methods associated with the Advanced Configuration and Power Interface System driver runtime component;

a System Management Mode runtime component;

one or more System Management Mode error handlers associated with the System Management Mode runtime component; and a processor to detect an error on the I/O hardware endpoint and to trigger an interrupt associated with the I/O hardware endpoint in response to detected error, wherein the Advanced Configuration and Power Interface System driver runtime component is to:

receive the interrupt and, in response to the received interrupt, determine whether the one or more Device-Specific Methods include a Device-Specific Method associated with the received interrupt;

if it is determined that the one or more Device-Specific Methods include a Device-Specific Method associated with the received interrupt, determine to handle the error using a System Management Mode handler associated with the I/O hardware endpoint; and if it is determined that the one or more Device-Specific Methods do not include a Device-Specific Method associated with the received interrupt:

determine to handle the error using a firmware runtime error handler associated with the I/O hardware endpoint; and trigger a firmware interrupt associated with the firmware runtime error handler.

16. A computing platform according to claim 15, wherein the Advanced Configuration and Power Interface System driver runtime component triggers a System Management Interrupt if it is determined to handle the error using a firmware runtime error handler using one of the one or more System Management Mode error handlers.

17. A computing platform according to claim 15, wherein the determination to handle the error using a firmware error handler associated with the I/O hardware endpoint comprises:

determination that one of the Advanced Configuration and Power Interface Device-Specific Methods is associated with the I/O hardware endpoint and one of the one or more System Management Mode error handlers.

18. A computing platform according to claim 17, the processor further to execute the one of the one or more System Management Mode error handlers and, after execution of the one of the one or more System Management Mode error handlers, execute an operating system handler associated with the I/O hardware endpoint.

19. A computing platform according to claim 15, wherein the I/O hardware endpoint is a memory device, wherein the I/O hardware endpoint controller is a memory controller within the processor, and wherein the interrupt is triggered in response to writing of error information by the memory controller into one or more Machine-Specific Registers of the processor.

20. A computing platform according to claim 15, wherein the I/O hardware endpoint is a Peripheral Component Interconnect express device, wherein the I/O hardware endpoint controller is a root port controller, and wherein the interrupt is triggered to a root port error handler.

* * * * *